(12) United States Patent
Geisler et al.

(10) Patent No.: US 9,804,192 B2
(45) Date of Patent: Oct. 31, 2017

(54) METHOD FOR CALIBRATING A MICROMECHANICAL SENSOR ELEMENT AND A SYSTEM FOR CALIBRATING A MICROMECHANICAL SENSOR ELEMENT

(71) Applicant: Robert Bosch GmbH, Stuttgart (DE)

(72) Inventors: Dominik Geisler, Tuebingen (DE); Thomas Claus, Tuebingen (DE); Jochen Hahn, Nufringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 139 days.

(21) Appl. No.: 14/968,335

(22) Filed: Dec. 14, 2015

(65) Prior Publication Data
US 2016/0169934 A1 Jun. 16, 2016

(30) Foreign Application Priority Data
Dec. 15, 2014 (DE) .................. 10 2014 225 858

(51) Int. Cl.
*G01P 21/00* (2006.01)
(52) U.S. Cl.
CPC .................... *G01P 21/00* (2013.01)
(58) Field of Classification Search
CPC ....... G01P 21/00; G01P 15/18; G01C 25/005; G01C 19/5776; G01C 19/5726
USPC ......................................... 73/1.37
See application file for complete search history.

(56) References Cited

U.S. PATENT DOCUMENTS

| 3,342,284 | A | * | 9/1967 | Baird | ............... B65H 23/0204 226/45 |
| 5,191,796 | A | * | 3/1993 | Kishi | ..................... B06B 1/06 310/336 |
| 7,171,847 | B2 | * | 2/2007 | Kuhn | ................. F02M 65/005 73/114.48 |
| 8,457,843 | B2 | * | 6/2013 | Niemz | ............... B62D 5/0469 180/204 |
| 8,941,303 | B2 | * | 1/2015 | Foltin | ................... B60Q 1/115 315/82 |
| 2005/0116729 | A1 | * | 6/2005 | Koester | ............... G01L 27/005 324/750.03 |
| 2008/0249732 | A1 | | 10/2008 | Lee et al. | |
| 2011/0041614 | A1 | * | 2/2011 | Wolfmayr | ............ G01H 11/06 73/654 |
| 2011/0082663 | A1 | * | 4/2011 | Geisler | ............. B60C 23/0416 702/141 |
| 2011/0296917 | A1 | * | 12/2011 | Reinmuth | ............ G01B 7/085 73/514.32 |

(Continued)

*Primary Examiner* — Eric S McCall
*Assistant Examiner* — Mohammed E Keramet-Amircola
(74) *Attorney, Agent, or Firm* — Norton Rose Fulbright US LLP; Gerard Messina

(57) ABSTRACT

A method for calibrating a micromechanical sensor element, a piece of primary information describing a motion-state of the micromechanical sensor element being ascertained by the micromechanical sensor element during a first time interval, a piece of reference information describing the motion-state of the micromechanical sensor element being ascertained during a second time interval on the basis of an acoustic signal emitted by a sound source, the first time interval and the second time interval overlapping at least partially with respect to time, and the reference information being compared with the primary information in order to calibrate the micromechanical sensor element.

10 Claims, 1 Drawing Sheet

(56) References Cited

U.S. PATENT DOCUMENTS

2013/0240230 A1* 9/2013 Saur ................. B25B 21/00
                                                173/178
2014/0060146 A1* 3/2014 Zoellin ............. G01L 27/005
                                                73/1.15
2014/0333473 A1* 11/2014 Steinbuch ........... G01S 7/4004
                                                342/174

* cited by examiner

METHOD FOR CALIBRATING A MICROMECHANICAL SENSOR ELEMENT AND A SYSTEM FOR CALIBRATING A MICROMECHANICAL SENSOR ELEMENT

RELATED APPLICATION INFORMATION

The present application claims priority to and the benefit of German patent application no. 10 2014 225 858.8, which was filed in Germany on Dec. 15, 2014, the disclosure of which is incorporated herein by reference.

FIELD OF THE INVENTION

The present invention relates to a method for calibrating a micromechanical sensor element and a system for calibrating a micromechanical sensor element.

BACKGROUND INFORMATION

Micromechanical sensor elements are believed to be understood from the related art, which may be used for ascertaining the position or the change in position of a mobile device, such as, e.g., a smartphone, in which the micromechanical sensor element is installed. In this case, a rotation rate sensor, a magnetic field sensor, and/or an acceleration sensor are typically used as the micromechanical sensor element.

In order to make a manufactured micromechanical sensor element operational, a calibration is required which determines a "bias," i.e., a bias voltage superimposed on a useful signal, and a sensitivity of the micromechanical sensor element. The quality of the calibration decisively depends on the reference information, which describes the motion-state of the micromechanical sensor element alternatively to describing the micromechanical sensor element. Established minimum requirements are therefore placed on such reference information in order to provide the preconditions for a successful calibration.

A method is discussed in the related art, for example, in the publication US 2008/0249732 A1, in which images are recorded in a complex manner using a camera, on the basis of which, in turn, the reference information regarding the motion-state is ascertained. Such a calibration procedure typically requires not only the presence of memory capacity which suffices to store the images, but also the avoidance of imaging errors, so that the reference information meets the desired minimum requirement for a successful calibration.

SUMMARY OF THE INVENTION

An object of the present invention is to provide a method in which reference information is easily ascertained, the reference information meeting the requirements for a successful calibration of the micromechanical sensor element. It is desirable, in particular, to reduce the amount of effort required to provide the reference information as compared to the related art.

The object may be achieved by a method for calibrating a micromechanical sensor element. A piece of primary information describing a motion-state of the micromechanical sensor element is ascertained by the micromechanical sensor element during a first time interval. Moreover, it is provided that a piece of reference information, which also describes the motion-state of the micromechanical sensor element or is influenced by it, is ascertained during a second time interval on the basis of a first acoustic signal, which is emitted by a sound source, and on the basis of a second acoustic signal, which is received by a microphone. In order to ensure that the reference information and the primary information describe the same motion-state of the micromechanical sensor element or are related thereto, the first time interval and the second time interval overlap at least partially with respect to time, i.e., the reference information and the primary information are ascertained essentially simultaneously according to the present invention, so that they represent the same motion-state of the micromechanical sensor element. Finally, the reference information is compared with the primary information in order to calibrate the micromechanical sensor element.

As compared to the related art, the method according to the present invention utilizes a first and a second acoustic signal to determine the reference information. Such a method is independent of magnetic interferences, inaccuracies of a detector, with which an acceleration of the micromechanical sensor element is determined, a presence of an optical pattern, a design of the optical pattern, prevailing light conditions, and an imaging capability of a module, with which the optical pattern is detected. In particular, the primary information describes the motion-state from the perspective of the micromechanical sensor element and the reference information describes the motion-state from the perspective of a method, which utilizes the first and the second acoustic signal to determine the same motion-state. The motion-state may be described by a position, a change in position, an orientation and/or a change in orientation of the micromechanical sensor element. In addition, it may be provided that the first time interval corresponds to the second time interval. It is conceivable that the reference information and the primary information are each represented by a chronological signal curve. In this case, in particular, the micromechanical sensor element provides the primary signal in the form of an output signal. For the calibration, it may then be provided that either the reference signal is compared with the primary signal at a common point in time or a change in the reference signal within the second time interval is compared with a change in the primary signal within the first time interval. In addition, it is provided that estimations, measurements, completed calibrations and/or calculations carried out in advance are additionally used or are taken into consideration during the calibration. In particular, it is provided that the reference information is ascertained on the basis of a comparison of the received second acoustic signal with the emitted first acoustic signal.

Advantageous embodiments and refinements of the present invention may be found in the further descriptions herein, and in the description with reference to the drawings.

According to a further specific embodiment of the present invention, it is provided that the motion-state of the micromechanical sensor element is changed or maintained during the first time interval and the second time interval. When a micromechanical sensor element is not moving, a "bias" or an offset, i.e., a bias voltage superimposed on the output signal of the micromechanical sensor element, may be ascertained on the basis of a stationary behavior of the reference information. When a micromechanical sensor element is moving, a sensitivity may be advantageously ascertained on the basis of the change in the reference information and the change in the primary information within the first time interval and the second time interval. As compared to the related art, the method may therefore be utilized for carrying out the calibration of the micromechanical sensor element "online," i.e., during an incidental motion of the micromechanical sensor element. Comparatively interference-free reference variables are provided via the determination of the motion-state with the aid of acoustic signals.

According to a further specific embodiment of the present invention it is provided that the second acoustic signal is received by a sound receiver, which is rigidly connected to the micromechanical sensor element. The second acoustic signal may be easily received with the aid of the sound receiver. Due to the rigid connection to the micromechanical sensor element, relative motion between the sound receiver and the micromechanical sensor element does not take place. A sound receiver capable of receiving ultrasonic signals may be used. As a result, ultrasonic signals may be advantageously used as the first and the second acoustic signal. Moreover, it is provided that the micromechanical sensor element and the sound receiver are installed in a shared device, such as a smartphone, for example.

According to a further specific embodiment of the present invention, it is provided that
- a second acoustic signal is received by a plurality of interconnected microphones or by a directional microphone, and/or
- the first acoustic signal is emitted by multiple sound sources.

In particular, the acoustic signal may be configured to be multichannel, the individual channels of the multichannel acoustic signal being distributed to the multiple sound sources. When multiple microphones are used, which are interconnected and may be distributed over the shared device, the motion-state may be ascertained on the basis of a signal strength of the second acoustic signal. In addition, the transit time of the acoustic signal, i.e., the time between the emission of the first acoustic signal and the reception of the second acoustic signal, may be utilized for ascertaining the motion-state. Moreover, it is conceivable that a measured pulse response of the acoustic signal is compared with a predicted, in particular computationally ascertained, pulse response when a single microphone or the directional microphone is utilized. A method for blind channel estimation may be used for determining the predicted pulse response. When the plurality of interconnected microphones is utilized and a micromechanical sensor element is static, i.e., not moving, the signal strength, in particular the amplification or attenuation thereof, at the microphones remains essentially unchanged and the transit times remain constant. When the micromechanical sensor element moves, a change in the motion-state is inferred on the basis of the change in the measured signal strength, in particular the amplification or attenuation thereof, and on the basis of the transit time. When the individual microphone or the directional microphone is utilized and the micromechanical sensor element is static, i.e., not moving, the measured pulse response and the calculated pulse response coincide. When the micromechanical sensor element moves, the orientation of the micromechanical sensor element may be advantageously ascertained on the basis of the change in the pulse response, which may be by indicating an angle. Moreover, it is conceivable that when multiple sound sources are used, the particular emitted first acoustic signals may differ from one another, for example, in terms of their frequency or their signal shape. When the particular configuration of the different first acoustic signals is known, the microphone may assign the received acoustic signals to the corresponding external sound sources. Moreover, it is conceivable that the sound receiver has a filter in order to blank out undesirable noises.

According to a further specific embodiment of the present invention, it is provided that an acoustic signal correlated with itself is used as the first acoustic signal. A training signal, which is easily evaluated, may be used. It is conceivable, for example, that the first acoustic signal is periodically modulated or has a superimposition of a plurality of different partial signals.

According to a further specific embodiment of the present invention, it is provided that an acoustic signal of an external sound source and/or an acoustic signal of an internal sound source, which is rigidly connected to the micromechanical sensor element, is used as the first acoustic signal. When an external sound source and/or an internal sound source is/are utilized, it may be provided that the configuration of the first acoustic signal is known by a control and processing unit and may be controlled by the control and processing unit in that the control and processing unit specifies, for example, when a first acoustic signal should be emitted by the sound source. For this purpose, the control and processing unit may have a wireless communication link to the external sound source. Moreover, it is provided that the external sound source is situated in a fixed position and the micromechanical sensor element is movable relative to the external sound source. When an internal sound source is used, a wall situated outside of the device, for example, which may be ensures that the emitted first acoustic signal is sent back to the sound receiver. In this way, an extremely compact, calibratable device having a micromechanical sensor element may be provided without the need to rely on the presence of an external sound source.

According to a further specific embodiment of the present invention, it is provided that the calibration is carried out by a control and processing unit. In particular, the control and processing unit compares the reference information with the primary information and, on the basis of this comparison, estimates the "bias" or the sensitivity of the micromechanical sensor element. It is conceivable that the control and processing unit includes a memory unit, in which the results of previous calibration processes or theoretical estimations of the "bias" or the sensitivity are stored. In turn, these results or estimations may be taken into consideration in a recalibration. For example, it may be established that a calibration be repeated if the estimated value obtained via the calibration deviates from a stored estimated value beyond a tolerance range. As a result, should a faulty estimation occur, which clearly deviates from the usual estimations, it may be advantageously ensured that this estimation will not be taken into consideration.

According to a further specific embodiment of the present invention, it is provided that an ultrasonic signal is used as the first acoustic signal. As a result, the method may be advantageously carried out without the signal being audible to humans.

According to a further specific embodiment of the present invention, it is provided that a rotation rate sensor, an acceleration sensor, and/or a magnetic field sensor is/are calibrated as the micromechanical sensor element.

A further subject matter of the present invention is a system for calibrating a micromechanical sensor element, according to the present invention, the system including a micromechanical sensor element, a sound source, for example, an internal and/or an external sound source, and a sound receiver.

DETAILED DESCRIPTION

Figure 1:
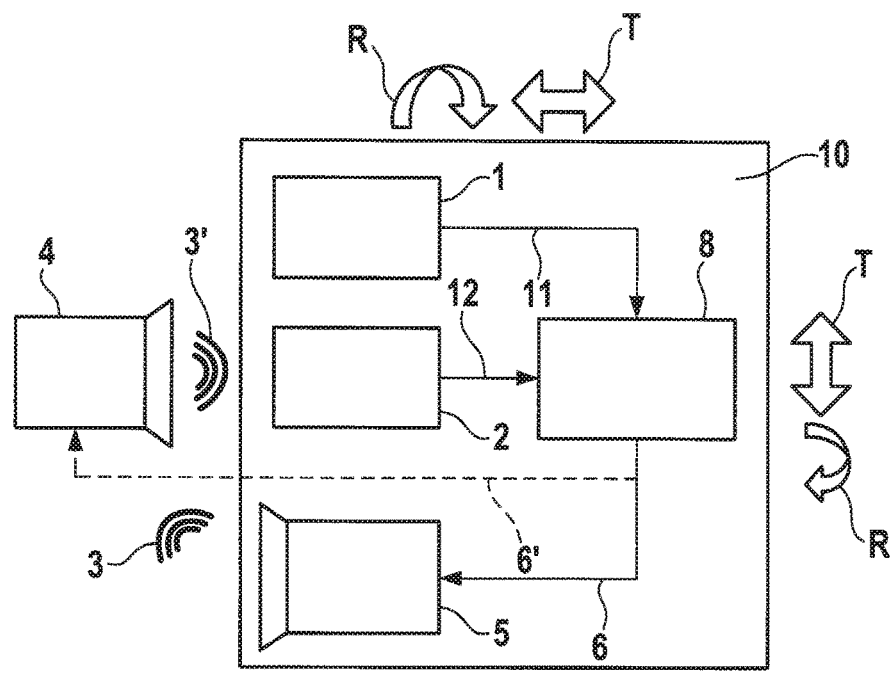
FIG. 1 shows a schematic depiction of a method for calibrating a micromechanical sensor element according to a first exemplary specific embodiment of the present invention.

In the various figures, identical parts are always provided with the same reference numerals and are therefore generally also each named or mentioned only once.

FIG. 1 shows a configuration for calibrating a micromechanical sensor element 1 according to one exemplary specific embodiment of the present invention. Micromechanical sensor elements 1 may be integrated, for example, into mobile devices 10, such as smartphones or vehicles, thereby making their capability of determining a motion-state available to device 10. The term motion-state may collectively refer to the position, the change in position, the orientation and/or the change in orientation of micromechanical sensor element 1. A one- to multi-dimensional translational motion T and/or a one- to multi-dimensional rotary motion R, for example, contribute to the change in the motion-state. It is conceivable, in this case, that a rotation rate sensor, a magnetic field sensor, and/or an acceleration sensor is/are integrated into device 10 as micromechanical sensor element 1. The motion-state of micromechanical sensor element 1 or device 10 is described from the perspective of micromechanical sensor element 1 in the form of primary information 11, which is provided by micromechanical sensor element 1. In particular, primary information 11 is provided by the micromechanical sensor element as an output signal, which includes a useful signal. The calibration of micromechanical sensor element 1 may account for a bias voltage, i.e., a bias, superimposed on the useful signal component being determined and that a measure for the sensitivity of the micromechanical sensor element, in particular during the determination of the motion-state, is established. In order to calibrate micromechanical sensor element 1, it is provided that a first acoustic signal 3, for example, in the form of an ultrasonic signal, is emitted from a sound source, and a second acoustic signal 3' is received by a sound receiver 2 or a microphone and, for example, the comparison between the first acoustic signal and second acoustic signal 3' is used for describing the motion-state of micromechanical sensor element 1 in the form of reference information 12. First acoustic signal 3 may be correlated with itself and is received by a sound receiver 2 or a microphone as second acoustic signal 3', sound receiver 2 being installed, together with micromechanical sensor element 1, in a shared device 10, and may be situated rigidly, i.e., essentially fixed in position, with respect to micromechanical sensor element 1. It is conceivable to use a training signal, which has been adapted to the evaluation, as first acoustic signal 3. For example, the training signal is temporally modulated. Moreover, it is provided that first acoustic signal 3 originates from an external sound source 4 and/or an internal sound source 5. For example, external sound source 4 and/or internal sound source 5 receive/receives a control signal 6, 6', which is emitted from a control and processing unit 8, which is also installed in the device, and establishes the temporal modulation and/or the point in time of first acoustic signal 3. It is conceivable that control signal 6' is wirelessly transmitted to the external sound source by control and processing unit 8. In particular, micromechanical sensor element 1 may be able to move relative to external sound source 4. In the case that an internal sound source 5 is utilized, this internal sound source 5 may be able to move freely relative to a wall at which a first acoustic signal 3 originating from the internal sound source is reflected. As a result, acoustic signal 3 received by sound receiver 2 may be used for determining the motion-state. In order to determine the position and orientation of micromechanical sensor element 1 with the aid of acoustic signal 3, it is further provided that acoustic signal 3 is received by a directional microphone or by a plurality of microphones, which are spatially distributed and, in particular, are situated on device 10 fixed in position relative to micromechanical sensor element 1. It is conceivable that a plurality of first acoustic signals 3, each of which is emitted by sound sources in different positions, is received by a microphone or sound receiver 2 situated on the device. When the plurality of microphones is utilized, second acoustic signal 3' having a certain signal strength is identified by each microphone. On the basis of the signal strength and a transit time, it may be advantageously established whether a change in position or orientation of micromechanical sensor element 1 has occurred. When a single microphone is utilized (i.e., the directional microphone or the microphone which receives multiple acoustic signals), a measured pulse response in the form of the second acoustic signal is compared with a predicted, in particular computationally ascertained, pulse response.

Figure 2:
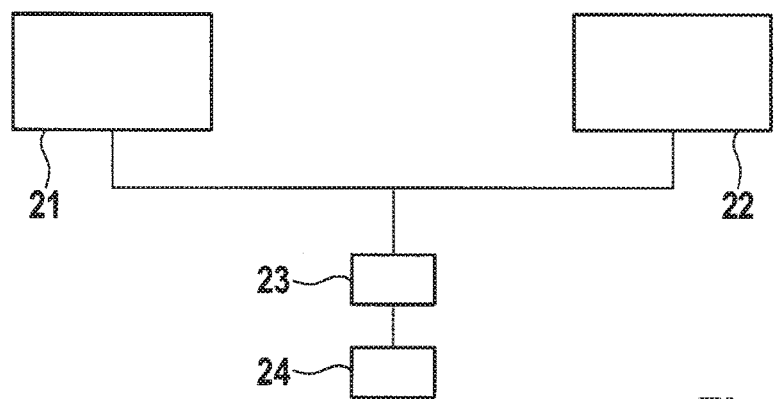
FIG. 2 shows a flow chart of the method for calibrating the micromechanical sensor element according to the first exemplary specific embodiment of the present invention.

FIG. 2 shows the method for calibrating micromechanical sensor element 1 according to the exemplary specific embodiment of the present invention in a flow chart. For the calibration, it is provided that reference information 12 is compared with primary information 11 and calibration 24 is carried out on the basis of this comparison 23. If micromechanical sensor element 1, for example, is not moved and reference information 12 remains constant within a second time interval, the output signal emitted by micromechanical sensor element 1 during the second time interval may be utilized for determining the bias, i.e., the bias voltage superimposed on the useful signal. It is conceivable, for example, that the output signal is subsequently corrected by this bias voltage with the aid of control and processing unit 8. In particular, it is provided that the sensitivity and the bias or the offset are estimated via the calibration if micromechanical sensor element 1 is moved and a piece of primary information is provided 22. In such a scenario, the changes in primary information 11 within the first time interval are compared with the change in reference information 12 within the second time interval, the first and the second time interval essentially corresponding to one another, i.e., are congruent with respect to time. By determining the motion-state with the aid of the first and the second acoustic signal, it is advantageously possible for reference information to be provided 21, which meets the minimum requirements for the successful calibration.

What is claimed is:
1. A method for calibrating a micromechanical sensor element, the method comprising:
ascertaining a piece of primary information, describing a motion-state of the micromechanical sensor element, by the micromechanical sensor element during a first time interval;
ascertaining a piece of reference information, which describes the motion-state of the micromechanical sensor element, during a second time interval based on a first acoustic signal, which is emitted by a sound source, and based on a second acoustic signal, which is received by a sound receiver, wherein the first time interval and the second time interval at least partially overlap with respect to time; and comparing the reference information with the primary information to calibrate the micromechanical sensor element.

2. The method of claim 1, wherein the motion-state of the micromechanical sensor element is one of changed and maintained during the first time interval and the second time interval.

3. The method of claim 1, wherein the second acoustic signal is received by a sound receiver, which is rigidly connected to the micromechanical sensor element.

4. The method of claim 1, wherein a second acoustic signal is received by a plurality of interconnected microphones or by a directional microphone, and/or the first acoustic signal is emitted by multiple sound sources.

5. The method of claim 1, wherein an acoustic signal, which is correlated with itself, is used as the first acoustic signal.

6. The method of claim 1, wherein an acoustic signal of an external sound source and/or an acoustic signal of an internal sound source, which is rigidly connected to the micromechanical sensor element, is used as the first acoustic signal.

7. The method of claim 1, wherein the calibration is carried out by a control and processing unit.

8. The method of claim 1, wherein an ultrasonic signal is used as the first acoustic signal.

9. The method of claim 1, wherein a rotation rate sensor, an acceleration sensor, and/or a magnetic field sensor is calibrated as the micromechanical sensor element.

10. A system for calibrating a micromechanical sensor, comprising:
    a micromechanical sensor element;
    a sound source;
    a sound receiver; and
    a control and processing unit, for calibrating the micromechanical sensor element, being configured to perform the following:
        ascertaining a piece of primary information, describing a motion-state of the micromechanical sensor element, by the micromechanical sensor element during a first time interval;
        ascertaining a piece of reference information, which describes the motion-state of the micromechanical sensor element, during a second time interval based on a first acoustic signal, which is emitted by a sound source, and based on a second acoustic signal, which is received by a sound receiver, wherein the first time interval and the second time interval at least partially overlap with respect to time; and
        comparing the reference information with the primary information to calibrate the micromechanical sensor element.

* * * * *